(12) United States Patent
Ishii et al.

(10) Patent No.: US 12,054,043 B2
(45) Date of Patent: Aug. 6, 2024

(54) TRANSMISSION DEVICE FOR WORK VEHICLE

(71) Applicant: KUBOTA CORPORATION, Osaka (JP)

(72) Inventors: Shinsuke Ishii, Sakai (JP); Naoko Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/009,353

(22) PCT Filed: Jun. 1, 2021

(86) PCT No.: PCT/JP2021/020881
§ 371 (c)(1),
(2) Date: Dec. 9, 2022

(87) PCT Pub. No.: WO2021/256250
PCT Pub. Date: Dec. 23, 2021

(65) Prior Publication Data
US 2023/0339317 A1    Oct. 26, 2023

(30) Foreign Application Priority Data

Jun. 15, 2020    (JP) .................................. 2020-103393

(51) Int. Cl.
*B60K 20/04* (2006.01)
*B60K 17/08* (2006.01)
(Continued)

(52) U.S. Cl.
CPC .............. *B60K 20/04* (2013.01); *B60K 17/08* (2013.01); *F16H 3/087* (2013.01); *F16H 63/20* (2013.01)

(58) Field of Classification Search
CPC ........ B60K 20/04; B60K 17/08; B60K 20/00; B60K 20/02; F16H 3/087; F16H 63/20; (Continued)

(56) References Cited

U.S. PATENT DOCUMENTS 5,462,148 A    10/1995    Azuma et al.

FOREIGN PATENT DOCUMENTS

| JP | 60-056635 A | 4/1985 |
| JP | 5-89062 U | 12/1993 |

(Continued)

OTHER PUBLICATIONS

English Translation of PCT/ISA/237 for PCT/JP2021/020881 (Year: 2021).*

(Continued)

*Primary Examiner* — Victor L MacArthur
(74) *Attorney, Agent, or Firm* — Keating & Bennett, LLP

(57) ABSTRACT

A transmission device for a work vehicle includes an auxiliary transmission including forward gear shift stages for the work vehicle to move forward and a reverse gear shift stage for the work vehicle to move backward. The forward gear shift stages include a low-speed gear shift stage with a largest gear ratio among the plurality of forward gear shift stages, and a medium-speed gear shift stage with a gear ratio closest to a gear ratio of the reverse gear shift stage among the forward gear shift stages.

6 Claims, 8 Drawing Sheets

(51) Int. Cl.
*F16H 3/087* (2006.01)
*F16H 63/20* (2006.01)
(58) Field of Classification Search
CPC ....... F16H 2063/202; F16H 2200/0078; F16H 2200/0095; F16H 61/18; F16H 3/091; B60Y 2200/221
See application file for complete search history.

(56) References Cited

FOREIGN PATENT DOCUMENTS

| | | |
|---|---|---|
| JP | 6-51597 U | 7/1994 |
| JP | 2003-54283 A | 2/2003 |

OTHER PUBLICATIONS

Official Communication issued in International Patent Application No. PCT/JP2021/020881, mailed on Aug. 10, 2021.

\* cited by examiner

TRANSMISSION DEVICE FOR WORK VEHICLE

CROSS REFERENCE TO RELATED APPLICATIONS

This is a U.S. National Phase application under 35 U.S.C. § 371 of International Patent Application No. PCT/JP2021/020881, filed Jun. 1, 2021, which claims priority of Japanese Patent Application No. 2020-103393, filed Jun. 15, 2020. The entire contents of which are hereby incorporated by reference.

BACKGROUND OF THE INVENTION

1. Field of the Invention

The present invention relates to a transmission device for a work vehicle including a predetermined transmission mechanism including a plurality of forward gear shift stages for the work vehicle to move forward and a reverse gear shift stage for the work vehicle to move backward.

2. Description of the Related Art

JP 2003-54283 A discloses a transmission device for a work vehicle including a predetermined transmission mechanism having a plurality of forward gear shift stages for the work vehicle to move forward and a reverse gear shift stage for the work vehicle to move backward. Even when the work vehicle does not include a shuttling mechanism that requires a gear shaft for switching between forward and backward motions, the predetermined transmission mechanism enables an operator to switch between forward and backward motions, which saves manufacturing cost.

SUMMARY OF THE INVENTION

Using the predetermined transmission mechanism to switch between forward and backward motions tends to cause an increase in speed difference between forward and backward motions. Every time an operator switches between forward and backward motions, the operator switches gears of another transmission mechanism or controls the accelerator pedal or the brake pedal to decrease the speed difference between forward and backward motions. For this reason, switching between forward and backward motions by the predetermined transmission mechanism tends to impose a complicated operation on the operator, which leaves room for improvement in operability.

Preferred embodiments of the present invention provide transmission devices for work vehicles each including a predetermined transmission mechanism including a plurality of forward gear shift stages for the work vehicle to move forward and a reverse gear shift stage for the work vehicle to move backward, the transmission device being capable of enhancing operability in changing between the forward and reverse gear shift stages.

A transmission device for a work vehicle according to an aspect of a preferred embodiment of the present invention includes a predetermined transmission mechanism including a plurality of forward gear shift stages for the work vehicle to move forward and a reverse gear shift stage for the work vehicle to move backward. The plurality of forward gear shift stages includes a low-speed gear shift stage with a largest gear ratio among the plurality of forward gear shift stages, and a predetermined gear shift stage with a gear ratio closest to a gear ratio of the reverse gear shift stage among the plurality of forward gear shift stages.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
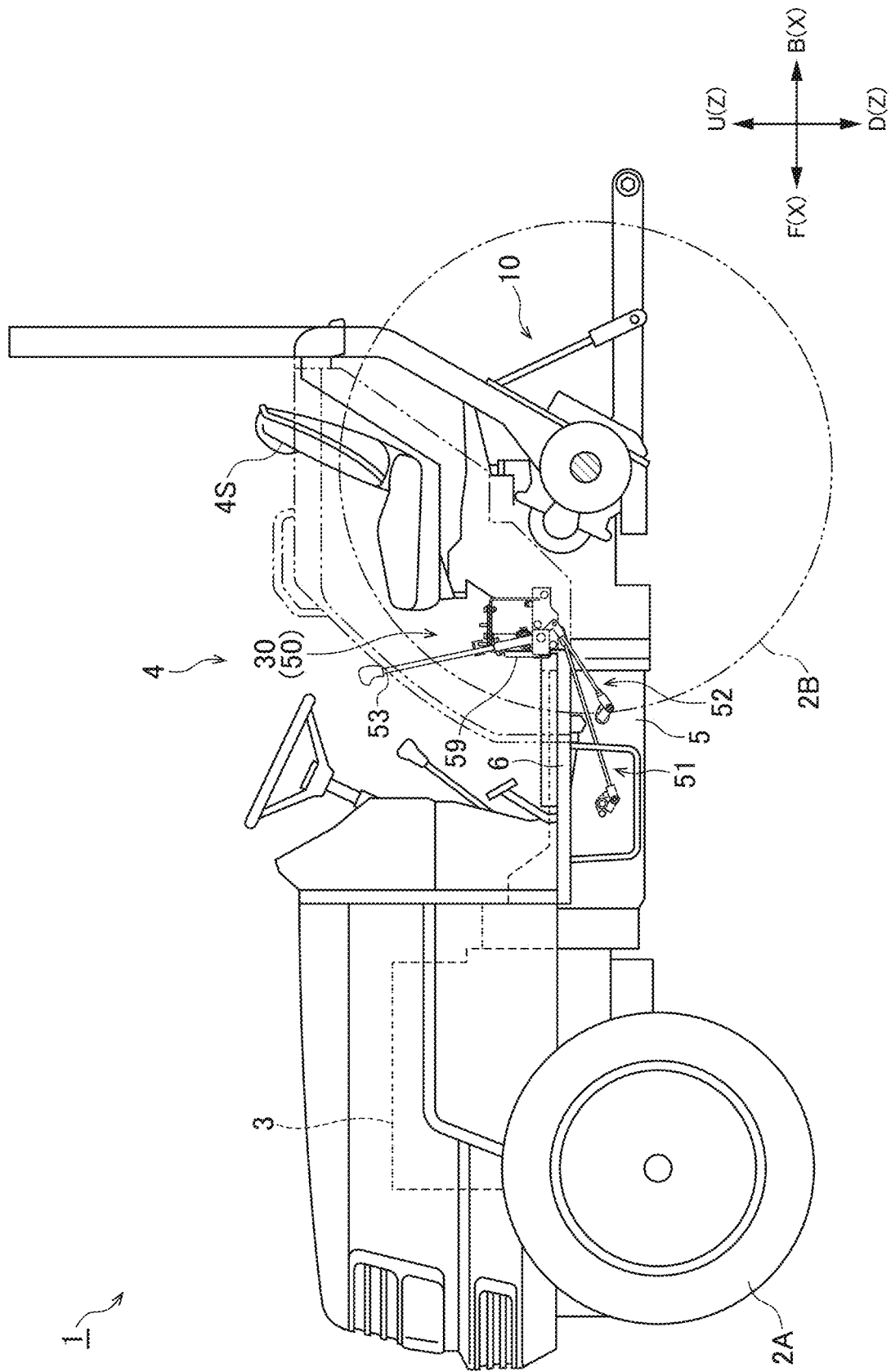
FIG. 1 is a left side view of a work vehicle according to a preferred embodiment of the present invention.

A transmission device for a work vehicle according to a preferred embodiment includes a predetermined transmission mechanism (an auxiliary transmission mechanism 50 according to a preferred embodiment) including a plurality of forward gear shift stages for the work vehicle to move forward and a reverse gear shift stage for the work vehicle to move backward. The plurality of forward gear shift stages includes a low-speed gear shift stage with a largest gear ratio among the plurality of forward gear shift stages, and a predetermined gear shift stage (a medium-speed gear shift stage in a preferred embodiment) with a gear ratio closest to a gear ratio of the reverse gear shift stage among the plurality of forward gear shift stages.

Since a predetermined gear has a gear ratio closest to that of the reverse gear shift stage, when changing between forward and backward motions, an operator changes between the predetermined gear and the reverse gear shift stage, thus decreasing the speed difference between forward and backward motions as compared with a case where the predetermined gear is shifted into another forward gear shift stage. This makes it easier to omit the complicated operation imposed on the operator to decrease the speed difference between forward and backward motions, which enhances operability in changing between the forward and reverse gear shift stages. In addition, since the predetermined gear has a gear ratio smaller than that of a low-speed gear, it is possible to make the forward speed faster than the low-speed gear, which enables reduction in working time as compared with a case where the work vehicle moves forward in the low-speed gear.

The transmission device for a work vehicle and can further include another transmission mechanism including a plurality of gear shift stages having different gear ratios. Using another transmission mechanism to change gear ratios makes it possible to change the speed of the work vehicle while the speed difference between forward and backward motions is kept small. This enables speed adjustment of the work vehicle according to the work to be done, thus enhancing work efficiency.

The gear ratio of the predetermined gear shift stage to the gear ratio of the reverse gear shift stage can be at a ratio of about 0.8 or more and about 1.2 or less to about 1, for example. Since the speed difference between forward and backward motions is decreased, it is easier to omit the complicated operation imposed on the operator to decrease the speed difference between forward and backward motions.

The plurality of forward gear shift stages can include: the low-speed gear shift stage, the predetermined gear shift stage, and a high-speed gear shift stage with the smallest gear ratio among the plurality of forward gear shift stages. Since the predetermined gear has a gear ratio larger than that of a high-speed gear, it is possible to prevent the forward speed from being too high, which enables the operator to work stably while changing between forward and backward motions. In addition, reducing the number of forward gear shift stages to three facilitates the operator's work.

The predetermined transmission mechanism can include a predetermined gear shifting lever (an auxiliary gear shifting lever according to a preferred embodiment) controlled by an operator to shift gear shift stages in the predetermined transmission mechanism. An operation position of the predetermined gear shifting lever can include a reverse operation position at which the gear shift stage is shifted into the reverse gear shift stage, and a predetermined operation position (a medium-speed operation position according to a preferred embodiment) at which the gear shift stage is shifted into the predetermined gear shift stage. The predetermined gear shifting lever can be configured to move linearly from the reverse operation position to the predetermined operation position. Moving a lever linearly, the operator can change between forward and backward motions by the predetermined transmission mechanism, which enhances operability in changing between the forward and reverse gear shift stages.

The predetermined transmission mechanism can include a predetermined gear shifting lever controlled by an operator to shift gear shift stages in the predetermined transmission mechanism, a lever arm configured to rock in a front-rear direction of the work vehicle by an operation of the predetermined gear shifting lever, and a lever protector extending upward from a step on which the operator seated on a driver's seat of the work vehicle places his/her feet, the lever protector being disposed between the lever arm and the step. The lever protector can be configured to stop the lever arm from rocking forward beyond a predetermined position by contact with the lever arm. Between a step and a lever arm, a lever protector stretches upward from the step, causing operator's feet to touch the lever protector before touching the lever arm, thus protecting the lever arm. Such a configuration makes it possible to prevent an erroneous operation caused by the operator's feet touching the lever arm. In addition, the lever protector stops the lever arm from rocking forward beyond a predetermined operation position by contact and prevents the predetermined transmission mechanism from being damaged by an excessive forward rocking of the lever arm. As described above, the lever protector having the function of preventing an erroneous operation by contact of the operator's feet and the function of preventing an excessive rocking enables reduction in the number of components and saves manufacturing cost.

The lever protector can include an upper end portion that is in contact with the lever arm and chamfered. Compared with a case where the lever arm comes into contact with an upper end corner of the lever protector, it is possible to reduce damage to the lever arm.

The lever arm can include a first lever arm and a second lever arm disposed outside the first lever arm in a width direction of the work vehicle. The lever protector can include a first lever protector configured to stop the first lever arm from rocking forward beyond the predetermined position by contact with the first lever arm, and a second lever protector configured to stop the second lever arm from rocking forward beyond the predetermined position by contact with the second lever arm, the second lever protector being spaced apart from the first lever protector in the width direction. Compared with a case where the lever protector is a wall extending in a width direction from a first lever arm to a second lever arm, it is possible to reduce cost of the lever protector, which saves manufacturing cost.

Preferred embodiments of the present invention will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions having different dimensional relationships and ratios between the drawings. In the present specification and drawings, elements having substantially the same functions and structures are denoted by the same reference numerals, and redundant description thereof is omitted, and elements not directly related to preferred embodiments of the present invention are omitted from the drawings.

A schematic configuration of a work vehicle 1 will be described with reference to FIGS. 1 and 2. In the following description, directions indicated by arrows X, Y, and Z in the drawings are defined as a front-rear direction of the traveling vehicle, a width direction of the traveling vehicle, and a height direction of the traveling vehicle, respectively. In addition, directions indicated by arrows U, D, F, B, L, and R in the drawings are defined as an upward direction, a downward direction, a forward direction, a backward direction, a left direction, and a right direction, respectively.

Figure 2:
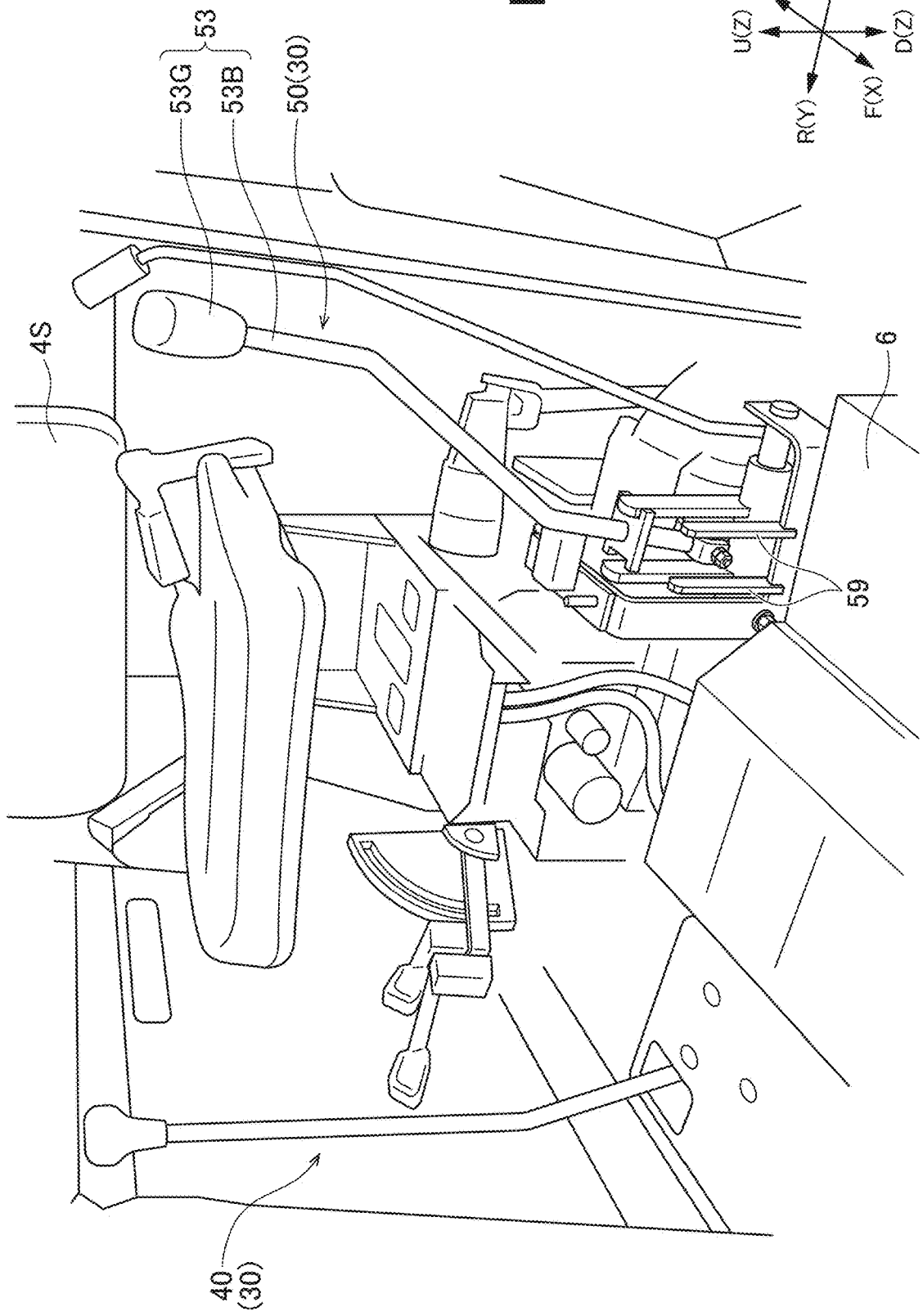
FIG. 2 is a perspective view of a driver space according to a preferred embodiment of the present invention as viewed from upper left front.

FIG. 1 illustrates the work vehicle 1. The work vehicle 1 according to this preferred embodiment is a tractor. The work vehicle 1 includes a pair of right-and-left front wheels 2F and a pair of right-and-left rear wheels 2B. The front wheels 2F and the rear wheels 2B are driven by a driving force from an engine 3 in a prime mover and causes the work vehicle 1 to travel.

The work vehicle 1 may include a driver space 4, a transmission case 5, a step 6, a linkage mechanism 10, and a transmission device 30. The driver space 4 includes a driver's seat 4S located behind the prime mover. The transmission case 5 is included in the rear portion of a vehicle body frame. An operator sitting on the driver's seat 4S of the work vehicle 1 places his/her feet on the step 6. Through the linkage mechanism 10, a work device is connected to the rear portion of the body of the work vehicle 1. An example of the work device includes a tilling device for tilling (such as rotary tiller and towing machine). In the work vehicle 1, the driving force of the engine 3 is drawn from a power-takeoff shaft disposed in the rear portion of the vehicle body frame and transmitted to the work device.

The transmission device 30 is used to change gear shift stages of the work vehicle 1. The transmission device 30 may include a main transmission mechanism 40 and an auxiliary transmission mechanism 50. The main transmission mechanism 40 corresponds to "another transmission mechanism". The auxiliary transmission mechanism 50 corresponds to "predetermined transmission mechanism".

The main transmission mechanism 40 includes a plurality of main gear shift stages having different gear ratios. In this preferred embodiment, the plurality of main gear shift stages include a first gear shift stage, a second gear shift stage, a third gear shift stage, a fourth gear shift stage, and a neutral gear shift stage. The first gear shift stage is a main gear shift stage with the largest gear ratio among the plurality of main gear shift stages. The second gear shift stage is a main gear shift stage with a gear ratio smaller than that of the first gear shift stage. The third gear shift stage is a main gear shift stage with a gear ratio smaller than that of the second gear shift stage. The fourth gear shift stage is a main gear shift stage with a gear ratio smaller than that of the third gear shift stage and with the smallest gear ratio among the plurality of main gear shift stages. The gear ratio of each main gear shift stage is a ratio of the number of rotations changed by the main transmission mechanism 40 to the number of rotations of the engine 3. The neutral gear shift stage creates a state where the driving force is not transmitted to the axle. In the neutral gear shift stage, the work vehicle 1 does not transmit power in both forward and backward directions.

The auxiliary transmission mechanism 50 includes a plurality of auxiliary gear shift stages. The auxiliary transmission mechanism 50 (plurality of auxiliary gears) includes a plurality of forward gear shift stages for the work vehicle 1 to move forward, a reverse gear shift stage for the work vehicle 1 to move backward, and a neutral gear shift stage. In this preferred embodiment, the plurality of forward gear shift stages include a low-speed gear shift stage, a medium-speed gear shift stage, and a high-speed gear shift stage.

The low-speed gear shift stage has the largest gear ratio among the plurality of forward gear shift stages. The medium-speed gear shift stage has a gear ratio smaller than that of the low-speed gear shift stage. The medium-speed gear shift stage is a predetermined auxiliary gear shift stage with a gear ratio closest to that of the reverse gear shift stage among the plurality of forward gear shift stages. The high-speed gear shift stage has a gear ratio smaller than that of the medium-speed gear shift stage. In addition, the high-speed gear shift stage has the smallest gear ratio among the plurality of forward gear shift stages. The gear ratio of each auxiliary gear shift stage is a ratio of the number of rotations changed by the auxiliary transmission mechanism 50 to the number of rotations of the engine 3. The neutral gear shift stage creates a state where the driving force is not transmitted to the axle. In the neutral gear shift stage, the work vehicle 1 does not transmit power in both forward and backward directions.

The gear ratio of the medium-speed gear shift stage to the gear ratio of the reverse gear shift stage (the gear ratio of the medium-speed gear shift stage/the gear ratio of the reverse gear shift stage) may be at a ratio of about 0.8 or more and about 1.2 or less to about 1, for example. A driver tends to feel that the backward motion is faster than the forward motion. For this reason, the gear ratio of the medium-speed gear shift stage to the gear ratio of the reverse gear shift stage may be at a ratio of more than about 1.0 and about 1.2 or less to about 1, for example. In a case where the tractor 1 is, for example, a work tractor which preferably moves faster in the backward direction than the forward direction, the gear ratio of the medium-speed gear shift stage to the gear ratio of the reverse gear shift stage may be at a ratio of more than about 1.0 and about 1.4 or less to about 1, for example. At a rated engine speed (for example, 2300 rpm), a difference between the reverse speed of the reverse gear shift stage and the forward speed of the medium-speed gear shift stage may be about 1 km/h, for example.

A schematic configuration of the transmission device 30 will be described with reference to FIGS. 1 to 8. The transmission device 30 includes the main transmission mechanism 40 and the auxiliary transmission mechanism 50. The main transmission mechanism 40 may be a mechanical transmission mechanism. That is, gear states of the main transmission mechanism 40 are changed not by electrical control but by a physical link. The main transmission mechanism 40 includes a main gear shifting lever 43, a main gear shifting unit 48, and a main gear shifting linkage (not illustrated). An operator controls the main gear shifting lever 43 to change main gear shift stages in the main transmission mechanism 40. The operation of the main gear shifting lever 43 is transmitted to the main gear shifting unit 48 through the main gear shifting linkage.

The main gear shifting unit 48 includes a first gear train 481, a second gear train 482, a third gear train 483, a fourth gear train 484, a first main sleeve S11, and a second main sleeve S12. The first gear train 481 includes a driver gear 481A attached to a first shaft C1 and a driven gear 481B attached to a second shaft C2. The driven gear 481B transmits a driving force input from the first shaft C1 via the driver gear 481A to the second shaft C2. Similarly, the second gear train 482 includes a driver gear 482A and a driven gear 482B, the third gear train 483 includes a driver gear 483A and a driven gear 483B, and the fourth gear train 484 includes a driver gear 484A and a driven gear 484B. The first main sleeve S11 shiftable along the first shaft C1 interlocks with the driver gear 481A of the first gear train 481 or the driver gear 482A of the second gear train 482. The second main sleeve S12 shiftable along the first shaft C1 interlocks with the driver gear 483A of the third gear train 483 or the driver gear 484A of the fourth gear train 484.

Figure 7A:
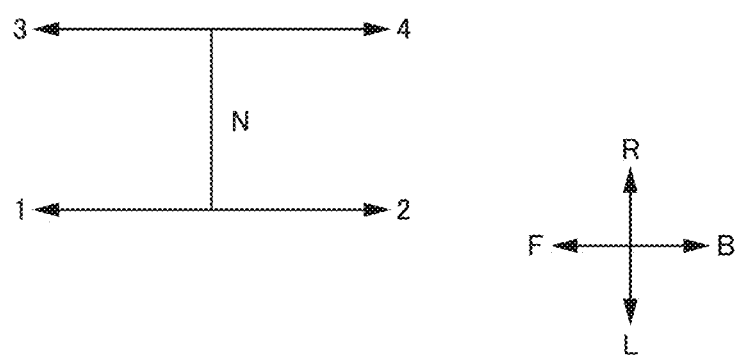
FIG. 7A is a schematic view illustrating a range of motion of a main gear shifting lever according to a preferred embodiment.

As illustrated in FIG. 7A, an operation position of the main gear shifting lever 43 has a first gear operation position at which the main gear shift stage is shifted into the first gear shift stage, a second gear operation position at which the main shift stage is shifted into the second gear shift stage, a third gear operation position at which the main gear shift stage is shifted into the third gear shift stage, and a fourth gear operation position at which the main gear shift stage is shifted into the fourth gear shift stage. Moving the position of the main gear shifting lever 43 to the first position causes the first main sleeve S11 to mesh with the driver gear 481A of the first gear train 481. Accordingly, the main gear shift stage of the main transmission mechanism 40 is shifted into the first gear shift stage. Similarly, moving the position of the main gear shifting lever 43 to the second position causes the first main sleeve S11 to mesh with the driver gear 482A of the second gear train 482, and the main gear shift stage of the main transmission mechanism 40 is shifted into the second gear shift stage. Furthermore, moving the position of the main gear shifting lever 43 to the third position causes the second main sleeve S12 to mesh with the driver gear 483A of the third gear train 483. Accordingly, the main gear shift stage of the main transmission mechanism 40 is shifted into the third gear shift stage. Similarly, moving the position of the main gear shifting lever 43 to the fourth position causes the second main sleeve S12 to mesh with the driver gear 484A of the fourth gear train 484, and the main gear shift stage of the main transmission mechanism 40 is shifted into the fourth gear shift stage.

Figure 3:
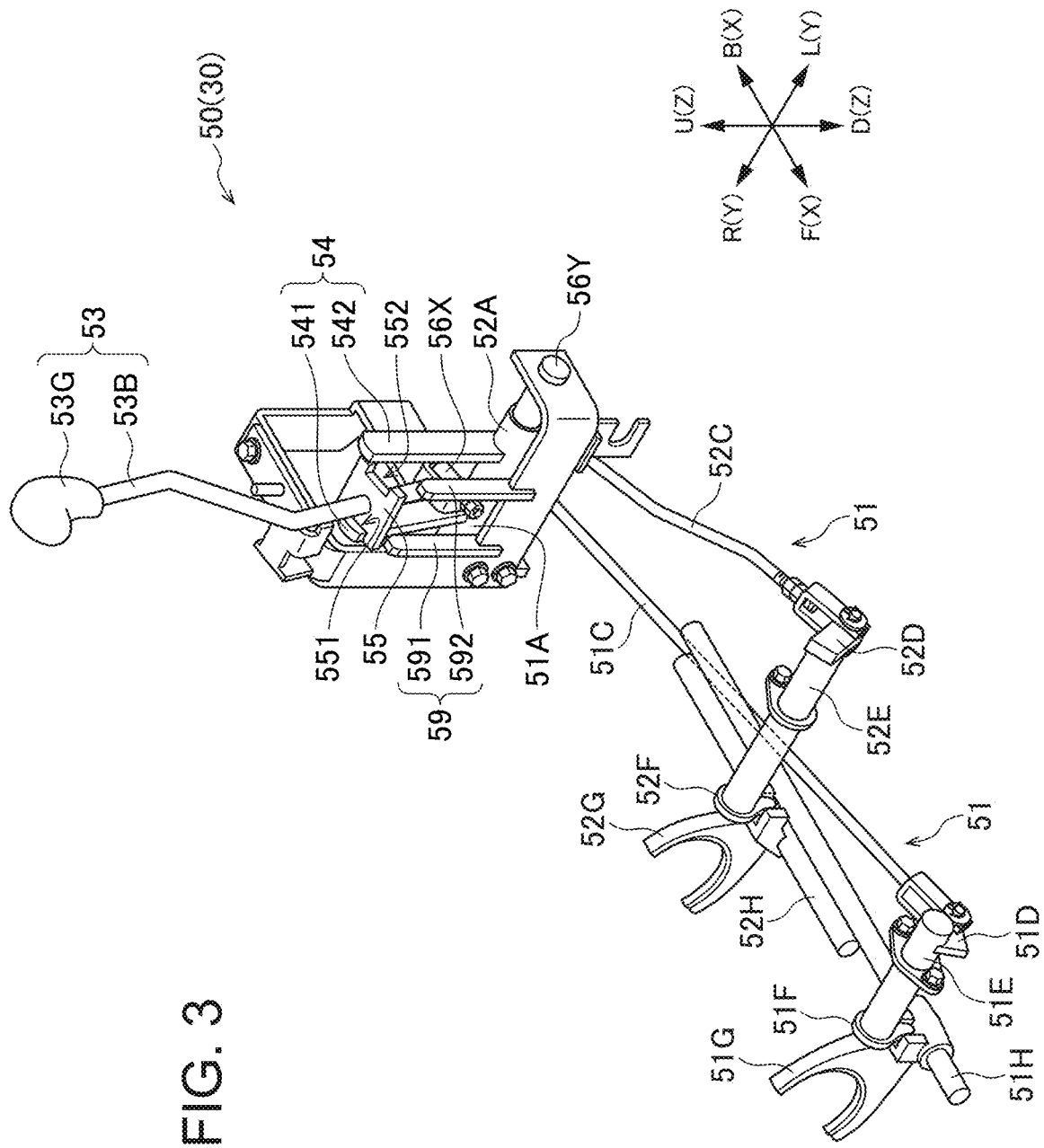
FIG. 3 is a perspective view of an auxiliary transmission mechanism according to a preferred embodiment of the present invention as viewed from upper left front.
Figure 4:
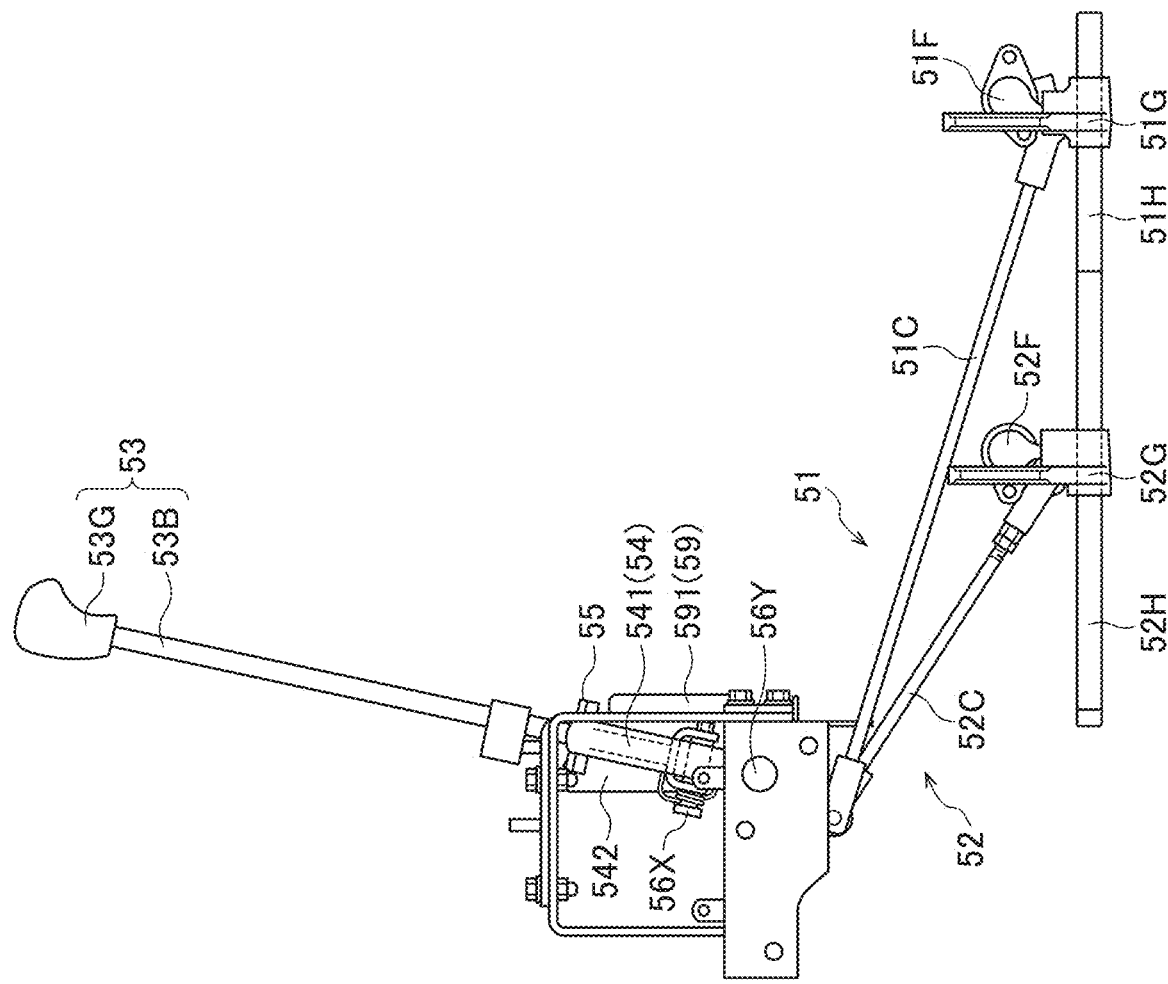
FIG. 4 is a right side view of the auxiliary transmission mechanism according to a preferred embodiment of the present invention.

The auxiliary transmission mechanism 50 may be a mechanical transmission mechanism. That is, gear states of the auxiliary transmission mechanism 50 are changed not by electrical control but by a physical link. As illustrated in FIG. 3, the auxiliary transmission mechanism 50 includes a first linkage 51, a second linkage 52, an auxiliary gear shifting lever 53, a lever arm 54, a gear selector 55, a front-rear rocker shaft 56X, a sideways rocker shaft 56Y, an auxiliary gear unit 58, and a lever protector 59. The first linkage 51 and the second linkage 52 will be described later. The auxiliary gear shifting lever 53 corresponds to "predetermined gear shifting lever".

The operator controls the auxiliary gear shifting lever 53 to change gear shift stages in the auxiliary transmission mechanism 50. The auxiliary gear shifting lever 53 includes a lever body 53B that rocks in the front-rear direction X and the width direction Y, and a grip 53G fixed to an upper end portion of the lever body 53B. The lever body 53B rocks in the width direction Y, having the front-rear rocker shaft 56X extending in the front-rear direction X as a rocker shaft. In addition, the lever body 53B rocks in the front-rear direction X, having the sideways rocker shaft 56Y extending in the width direction Y as a rocker shaft. The operator holds the grip 53G to control the auxiliary transmission mechanism 50.

The lever arm 54 rocks in the front-rear direction X of the work vehicle 1 when being operated by the auxiliary gear shifting lever 53. The lever arm 54 includes a first lever arm 541 and a second lever arm 542. The second lever arm 542 is disposed outside the first lever arm 541 in the width direction Y.

Figure 5:
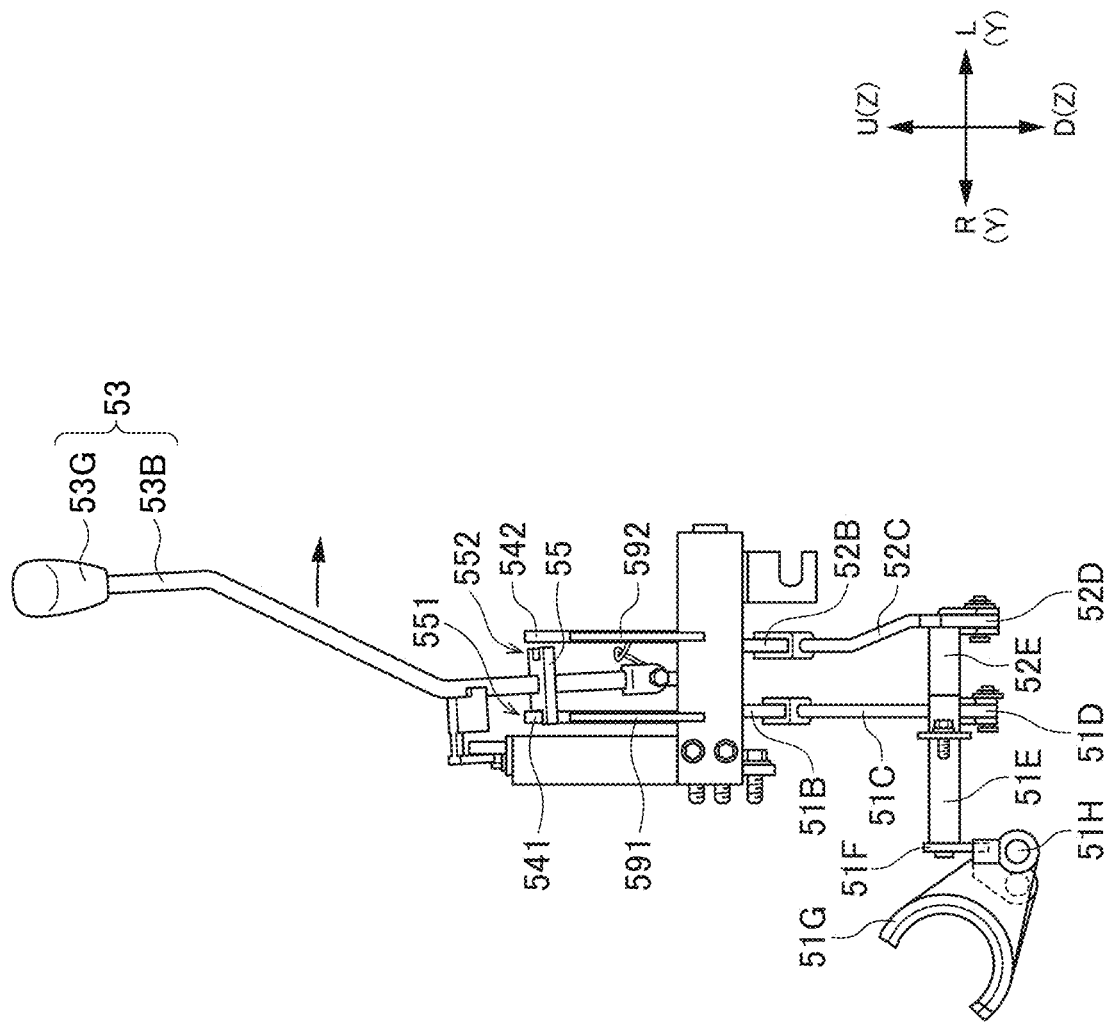
FIG. 5 is a front view of the auxiliary transmission mechanism according to a preferred embodiment of the present invention.
Figure 6:
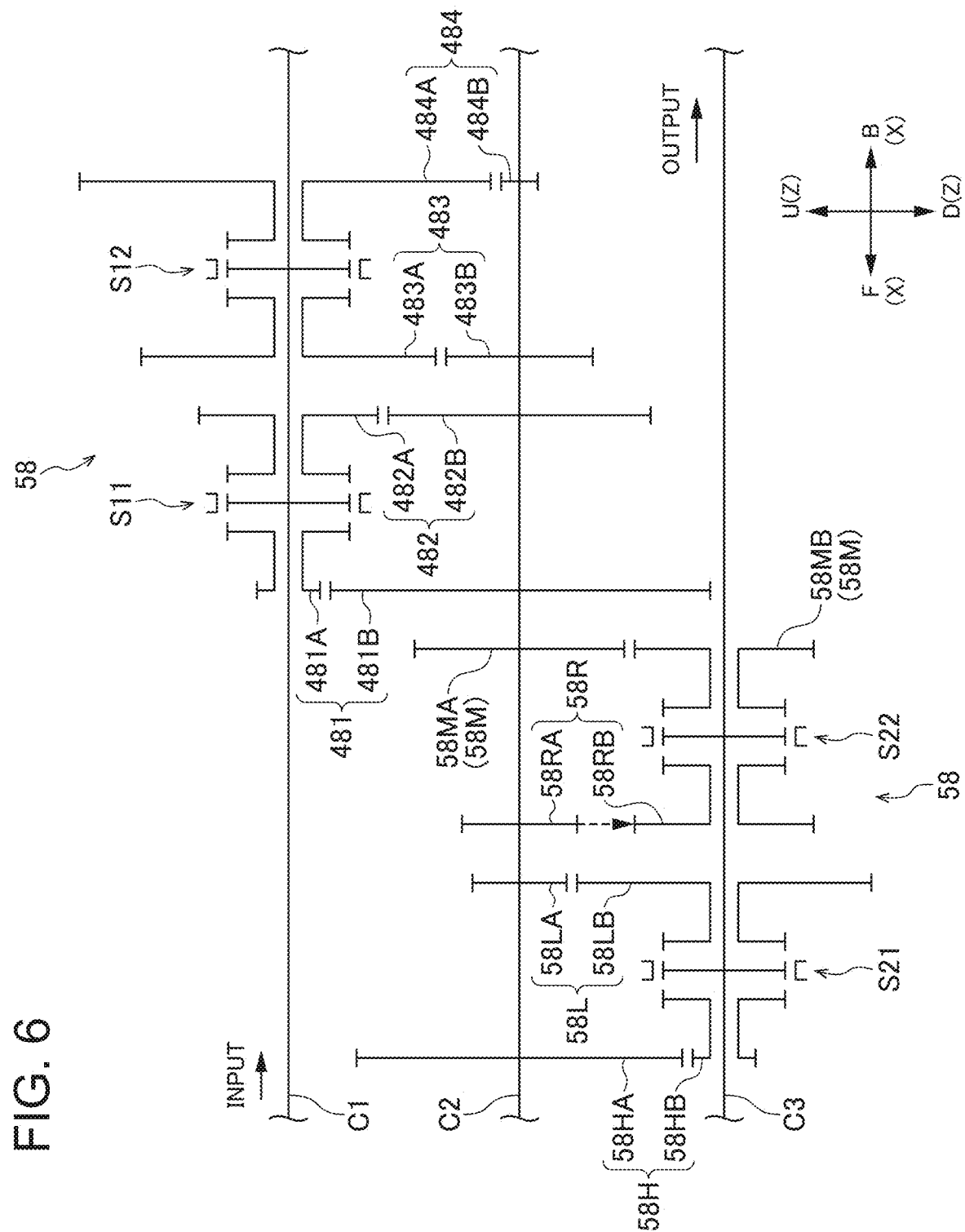
FIG. 6 is a schematic view illustrating a portion of a transmitting system according to a preferred embodiment of the present invention.

The gear shifting selector 55 is engaged with the lever arm 54 and causes the lever arm 54 to rock in the front-rear direction X when being operated by the auxiliary gear shifting lever 53. The gear shifting selector 55 is fixed to the auxiliary gear shifting lever 53, specifically, the lever body 53B. The gear shifting selector 55 includes a first recess 551 that is recessed outward in the width direction Y from the right side of the gear shifting selector 55 and a second recess 552 that is recessed inward in the width direction Y from the left side of the gear shifting selector 55. As illustrated in FIGS. 3 and 5, rocking the auxiliary gear shifting lever 53 inward in the width direction Y (right direction R) causes the first lever arm 541 to engage with the first recess 551. In addition, as illustrated in FIG. 2, rocking the auxiliary gear shifting lever 53 outward in the width direction Y (left direction L) causes the second lever arm 542 to engage with the second recess 552.

The auxiliary gear shifting unit 58 includes a low-speed forward gear train 58L, a medium-speed forward gear train 58M, a high-speed forward gear train 58H, a reverse gear train 58R, a first auxiliary sleeve S21, and a second auxiliary sleeve S22. The low-speed forward gear train 58L includes a driver gear 58LA attached to the second shaft C2 and a driven gear 58LB attached to a third shaft C3. The driven gear 58LB transmits a driving force input from the second shaft C2 via the driver gear 58LA to the third shaft C3. The medium-speed forward gear train 58M includes a driver gear 58MA attached to the second shaft C2 and a driven gear 58MB attached to the third shaft C3. The driven gear 58MB transmits a driving force input from the second shaft C2 via the driver gear 58MA to the third shaft C3. The high-speed forward gear train 58H includes a driver gear 58HA attached to the second shaft C2 and a driven gear 58HB attached to the third shaft C3. The driven gear 58HB transmits a driving force input from the second shaft C2 via the driver gear 58HA to the third shaft C3. The reverse gear train 58R includes a first idling gear 58RA attached to the second shaft C2, a second idling gear (not illustrated) attached to another shaft and meshing with the first idling gear 58RA, and a driven gear 58RB attached to the third shaft C3. The driven gear 58RB transmits a driving force input from the second shaft C2 via the first idling gear 58RA and the second idling gear to the third shaft C3. The first auxiliary sleeve S21 shiftable along the third shaft C3 interlocks with the driven gear 58LB of the low-speed forward gear train 58L or the driven gear 58HB of the high-speed forward gear train 58H. The second auxiliary sleeve S22 shiftable along the third shaft C3 interlocks with the driven gear 58MB of the medium-speed forward gear train 58M or the driven gear 58RB of the reverse gear train 58R.

The first linkage 51 includes a first cylinder 51A, a first arm 51B, a first rod 51C, a third arm 51D, a first rocker shaft 51E, a first engagement portion 51F, a first shift fork 51G, and a first fork rod 51H. The first cylinder 51A is rotatably attached to the sideways rocker shaft 56Y, and the first lever arm 541 is fixed to the first cylinder 51A. The first arm 51B is fixed to the first cylinder 51A. The first arm 51B rocks in the front-rear direction X via the first cylinder 51A corresponding to a rocking of the first lever arm 541. The first rod 51C slides in the front-rear direction X corresponding to The rocking of the first arm 51B. One end portion of the first rod 51C is connected to the first arm 51B, and the other end portion of the first rod 51C is connected to the third arm 51D. The third arm 51D is fixed to the first rocker shaft 51E. The third arm 51D rocks in the front-rear direction X, having the first rocker shaft 51E as a rocker shaft, corresponding to the slide of the first rod 51C. The first rocker shaft 51E stretches in the width direction Y. The third arm 51D is fixed to one end portion of the first rocker shaft 51E. The first engagement portion 51F is rockably connected to the other end portion of the first rocker shaft 51E. The first engagement portion 51F engages with the first shift fork 51G. The first shift fork 51G is inserted into the first fork rod 51H stretching in the front-rear direction X and shiftable along the first fork rod 51H. The first shift fork 51G shifts in the front-rear direction X corresponding to a rocking of the first engagement portion 51F. The first shift fork 51G is connected to the first auxiliary sleeve S21, and the first auxiliary sleeve S21 is shifted corresponding to the shift of the first shift fork 51G.

The second linkage 52 includes a second cylinder 52A, a second arm 52B, a second rod 52C, a fourth arm 52D, a second rocker shaft 52E, a second engagement portion 52F, a second shift fork 52G, and a second fork rod 52H. The second cylinder 52A is rotatably attached to the sideways rocker shaft 56Y, and the second lever arm 542 is fixed to the second cylinder 52A. The second arm 52B is fixed to the second cylinder 52A. The second arm 52B rocks in the front-rear direction X via the second cylinder 52A corresponding to a rocking of the second lever arm 542. The second rod 52C slides in the front-rear direction X corresponding to The rocking of the second arm 52B. One end portion of the second rod 52C is connected to the second arm 52B, and the other end portion of the second rod 52C is connected to the fourth arm 52D. The fourth arm 52D is fixed to the second rocker shaft 52E. The fourth arm 52D rocks in the front-rear direction X, having the second rocker shaft 52E as a rocker shaft, corresponding to the slide of the second rod 52C. The second rocker shaft 52E stretches in the width direction Y. The fourth arm 52D is fixed to one end portion of the second rocker shaft 52E. The second engagement portion 52F is rockably connected to the other end portion of the second rocker shaft 52E. The second engagement portion 52F engages with the second shift fork 52G. The second shift fork 52G is inserted into the second fork rod 52H stretching in the front-rear direction X and shiftable along the second fork rod 52H. The second shift fork 52G shifts in the front-rear direction X corresponding to a rocking of the second engagement portion 52F.

The lever protector 59 stretches upward from the step 6 between the step 6 and the lever arm 54. The lever protector 59 stops the lever arm 54 from rocking forward beyond a predetermined position by contact with the lever arm 54. An upper end portion of the lever protector 59 is in contact with the lever arm 54 and chamfered. In the present preferred embodiment, the rear end of the upper end portion of the lever protector 59 is chamfered. The lever protector 59 is a plate-shaped structure. The lever protector 59 may have a height lower than that of the lever arm 54. The lever protector 59 may have a width narrower than that of the lever arm 54.

The lever protector 59 includes a first lever protector 591 and a second lever protector 592. The first lever protector 591 stops the first lever arm 541 from rocking forward beyond the predetermined position by contact with the first lever arm 541. The second lever protector 592 stops the second lever arm 542 from rocking forward beyond the predetermined operation position by contact with the second lever arm 542. The second lever protector 592 is spaced apart from the first lever protector 591 in the width direction Y.

Figure 7B:
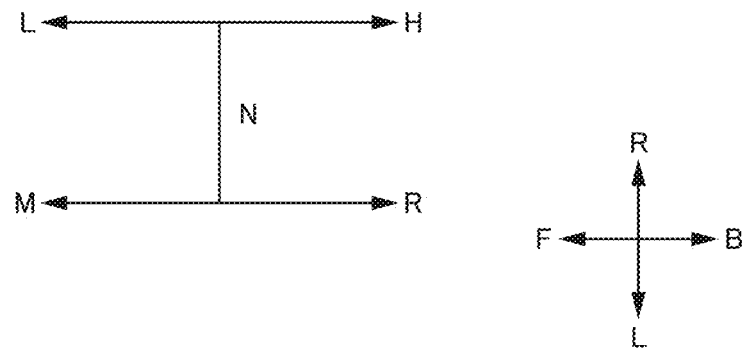
FIG. 7B is a schematic view illustrating a range of motion of an auxiliary gear shifting lever according to a preferred embodiment of the present invention.

As shown in FIG. 7B, in this preferred embodiment, the auxiliary gear shifting lever 53 has a low-speed operation position L at which the auxiliary gear shift stage is shifted into the low-speed gear shift stage, a medium-speed operation position M at which the auxiliary gear shift stage is shifted into the medium-speed gear shift stage, a high-speed operation position H at which the auxiliary gear shift stage is shifted into the high-speed gear shift stage, a reverse operation position R at which the auxiliary gear shift stage is shifted into the reverse gear shift stage, and a neutral operation position N at which the auxiliary gear shift stage is shifted into the neutral gear shift stage. The reverse operation position R corresponds to a "predetermined operation position".

The auxiliary gear shifting lever 53 moves linearly from the low-speed operation position L to the high-speed operation position H. The high-speed operation position H is disposed behind the low-speed operation position L. The auxiliary gear shifting lever 53 moves linearly from the medium-speed operation position M to the reverse operation position R. The auxiliary gear shifting lever 53 moves linearly from the reverse operation position R to the medium-speed operation position M. In the present preferred embodiment, the reverse operation position R is disposed behind the medium-speed operation position M. The medium-speed operation position M and the reverse operation position R are disposed outside the low-speed operation position L and the high-speed operation position H in the width direction Y. The neutral operation position N is placed between the medium-speed operation position M and the reverse operation position R. The auxiliary gear shifting lever 53 is movable to the medium-speed operation position M, the reverse operation position R, the low-speed operation position L, and the high-speed operation position H via the neutral operation position N. In top view, the auxiliary gear shifting lever 53 has an H-shaped range of motion.

In order to move the operation position of the auxiliary gear shifting lever 53 from the low-speed operation position L to the high-speed operation position H, the operator moves the auxiliary gear shifting lever 53 backward. This causes the first lever arm 541 engaged with the gear shifting selector 55 to rock backward. The rocking of the first lever arm 541 causes the first cylinder 51A to rotate with the sideways rocker shaft 56Y defining and functioning as a rocker shaft, and the first arm 51B rocks forward. This causes the first rod 51C to slide forward, and the third arm 51D rocks forward with the first rocker shaft 51E defining and functioning as a rocker shaft. The rocking of the third arm 51D causes the first engagement portion 51F to rock forward together with the rotation of the first rocker shaft 51E. The first shift fork 51G engaged with the first engagement portion 51F shifts forward along the first fork rod 51H, and the first auxiliary sleeve S21 shifts. Accordingly, the first auxiliary sleeve S21 meshes with the driven gear 58HB of the high-speed forward gear train 58H, and the auxiliary gear of the auxiliary transmission mechanism 50 is shifted into the high-speed gear.

Furthermore, in order to move the operation position of the auxiliary gear shifting lever 53 to the neutral operation position M, the operator moves the auxiliary gear shifting lever 53 to the neutral operation position N in front of the high-speed operation position H and moves the auxiliary gear shifting lever 53 outward in the width direction Y (left direction L). This causes disengagement of the gear shifting selector 55 and the first lever arm 541, and the gear sifting selector 55 is engaged with the second lever arm 542. Accordingly, the first auxiliary sleeve S21 is separated from the driven gear 58HB of the high-speed forward gear train 58H, and the auxiliary gear shift stage is changed from the high-speed gear shift stage to the neutral gear shift stage.

After that, moving the auxiliary gear shifting lever 53 forward causes the auxiliary gear shifting lever 53 to move from the neutral operation position N to the medium-speed operation position M. This causes the second lever arm 542 engaged with the gear shifting selector 55 to rock forward. The rocking of the second lever arm 542 causes the second cylinder 52A to rotate with the sideways rocker shaft 56Y defining and functioning as a rocker shaft, and the second arm 52B rocks backward. This causes the second rod 52C to slide backward, and the fourth arm 52D rocks backward with the second rocker shaft 52E defining and functioning as a rocker shaft. The rocking of the fourth arm 52D causes the second engagement portion 52F to rock backward together with the rotation of the second rocker shaft 52E. The second shift fork 52G engaged with the second engagement portion 52F shifts backward along the second fork rod 52H, and the second auxiliary sleeve S22 shifts. Accordingly, the second auxiliary sleeve S22 meshes with the driven gear 58MB of the medium-speed forward gear train 58M, and the auxiliary gear shift stage of the auxiliary transmission mechanism 50 is shifted into the medium-speed gear shift stage.

Figure 8:
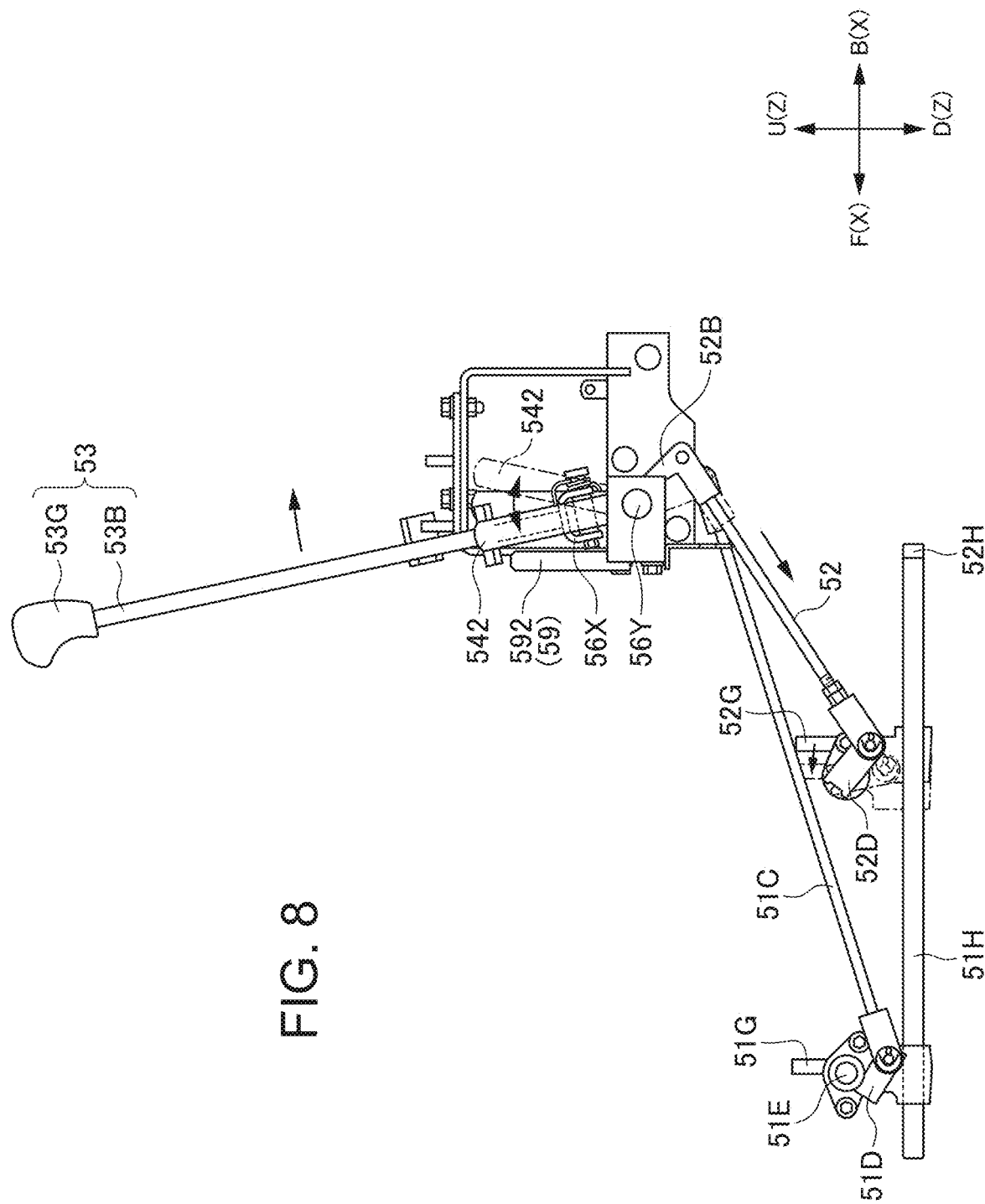
FIG. 8 is a left side view of an auxiliary transmission mechanism according to a preferred embodiment of the present invention.

In changing from forward motion (medium-speed gear shift stage) to backward motion (reverse gear shift stage), the operator moves the auxiliary gear shifting lever 53 backward as illustrated in FIG. 8. The auxiliary gear shifting lever 53 moves from the medium-speed operation position M to the reverse operation position R. This causes the second lever arm 542 engaged with the gear shifting selector 55 to rock backward. The rocking of the second lever arm 542 causes the second cylinder 52A to rotate with the sideways rocker shaft 56Y defining and functioning as a rocker shaft, and the second arm 52B rocks forward. This causes the second rod 52C to slide forward, and the fourth arm 52D rocks forward with the second rocker shaft 52E defining and functioning as a rocker shaft. The rocking of the fourth arm 52D causes the second engagement portion 52F to rock forward together with the rotation of the second rocker shaft 52E. The second shift fork 52G engaged with the second engagement portion 52F shifts forward along the second fork rod 52H, and the second auxiliary sleeve S22 shifts. Accordingly, the second auxiliary sleeve S22 meshes with the driven gear 58RB of the reverse gear train 58R, and the auxiliary gear shift stage of the auxiliary transmission mechanism 50 is changed from the medium-speed gear shift stage to the reverse gear shift stage. With this process, the traveling work vehicle 1 is changed from forward motion to backward motion.

Similarly, in changing from backward motion (reverse gear shift stage) to forward motion (medium-speed gear shift stage), the operator moves the auxiliary gear shifting lever 53 forward. The auxiliary gear shifting lever 53 moves from the reverse operation position R to the medium-speed operation position M, the second auxiliary sleeve S22 meshes with the driven gear 58MB of the medium-speed forward gear train 58M, and the auxiliary gear shift stage of the auxiliary transmission mechanism 50 is changed from the reverse gear shift stage to the medium-speed gear shift stage. With this process, the traveling work vehicle 1 is changed from backward motion to forward motion.

As described above, in this preferred embodiment, the plurality of forward gear shift stages include the low-speed gear shift stage with the largest gear ratio among the plurality of forward gear shift stages and the medium-speed gear shift stage with a gear ratio closest to a gear ratio of the reverse gear shift stage among the plurality of forward gear shift stages. Since the medium-speed gear shift stage has a gear ratio closest to that of the reverse gear shift stage, when changing between forward and backward motions, an operator changes between the medium-speed gear shift stage and the reverse gear shift stage, thus decreasing the speed difference between forward and backward motions as compared with a case where the medium-speed gear shift stage is shifted into another forward gear shift stage. This makes it easier to omit the complicated operation imposed on the operator to decrease the speed difference between forward and backward motions, which enhances operability in changing between the forward and reverse gear shift stages. In addition, since the medium-speed gear shift stage has a gear ratio smaller than that of the low-speed gear shift stage, it is possible to make the forward speed faster than the low-speed gear shift stage, which enables reduction in working time as compared with a case where the work vehicle 1 moves forward in the low-speed gear shift stage.

In this preferred embodiment, the transmission device 30 includes the main transmission mechanism 40. Using the main transmission mechanism 40 to change gear ratios makes it possible to change the speed of the work vehicle 1 while the speed difference between forward and backward motions is kept small. This enables speed adjustment of the work vehicle 1 according to the work to be done, thus enhancing work efficiency.

For this reason, in this preferred embodiment, the gear ratio of the medium-speed gear shift stage to the gear ratio of the reverse gear shift stage may be at a ratio of about 0.8 or more and about 1.2 or less to about 1, for example. Since the speed difference between forward and backward motions is decreased, it is easier to omit the complicated operation imposed on the operator to decrease the speed difference between forward and backward motions.

In this preferred embodiment, the plurality of forward gear shift stages includes the low-speed gear shift stage, the medium-speed gear shift stage, and the high-speed gear shift stage. Since the medium-speed gear shift stage has a gear ratio larger than that of the high-speed gear shift stage, it is possible to prevent the forward speed from being too high, which enables the operator to work stably while changing between forward and backward motions. In addition, reducing the number of forward gear shift stages to three facilitates the operator's work.

In this preferred embodiment, a range of motion from the reverse operation position to the neutral operation position is linear. With such a configuration, moving the auxiliary gear shifting lever 53 linearly, the operator can change between forward and backward motions by the auxiliary transmission mechanism 50, which enhances operability in changing between the forward and reverse gear shift stages.

In this preferred embodiment, the lever protector 59 extends upward from the step 6 between the step 6 and the lever arm 54. The operator's feet touch the lever protector 59 before touching the lever arm 54, enabling protection of the lever arm 54. This makes it possible to prevent an erroneous operation by contact of the operator's feet with the lever arm 54. In addition, the lever protector 59 stops the lever arm 54 from rocking forward beyond the predetermined position by contact with the lever arm 54. Accordingly, it is possible to prevent the auxiliary transmission mechanism 50 from being damaged by an excessive forward rocking of the lever arm 54. As described above, the lever protector 59 having the function of preventing an erroneous operation by contact of the operator's feet and the function of preventing an excessive rocking enables reduction in the number of components and saves manufacturing cost.

Furthermore, in this preferred embodiment, the upper end portion of the lever protector 59 is in contact with the lever arm 54 and is chamfered. The lever protector 59 is a plate-shaped member. Such a configuration makes it possible to reduce damage to the lever arm 54 as compared with a case where the lever arm 54 comes into contact with an upper end corner of the lever protector 59.

In this preferred embodiment, the lever protector 59 includes the first lever protector 591 and the second lever protector 592 spaced apart from the first lever protector 591 in the width direction Y. Such a configuration enables reduction in cost of the lever protector 59 and saves manufacturing cost as compared with a case where the lever protector 59 is a wall-like member extending in the width direction Y from the first lever arm 541 to the second lever arm 542.

Other Preferred Embodiments

Although the present invention has been described in detail with reference to the preferred embodiments described above, it will be apparent to those skilled in the art that the present invention is not limited to the preferred embodiments described herein. The present invention may be practiced as modifications and variations without departing from the spirit and scope of the present invention as defined by the claims. Accordingly, the description herein is intended to be illustrative and has no restrictive meaning with respect to the present invention.

For example, in the preferred embodiments, the transmission device 30 includes the main transmission mechanism 40 and the auxiliary transmission mechanism 50, but the present invention is not limited thereto. The transmission device 30 may include one transmission mechanism that changes between forward and backward motions, corresponding to the auxiliary transmission mechanism 50. Furthermore, in the auxiliary transmission mechanism 50, the plurality of forward gear shift stages may include four or more forward gear shift stages.

In addition, an upper edge of the lever protector 54 in the preferred embodiments may be arc shaped in a side view of the tractor 1. With such a configuration, when the upper edge of the lever protector 59 comes into contact with the lever arm 54, no corner comes into contact with the lever arm 54, which makes it possible to reduce damage to the lever arm 54 as compared with a case where the lever arm 54 comes into contact with an upper end corner of the lever protector 59.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
    a step for placement of feet of an operator seated on a driver's seat of the work vehicle; and
    a transmission including a plurality of forward gear shift stages for the work vehicle to move forward and a reverse gear shift stage for the work vehicle to move backward; wherein
    the plurality of forward gear shift stages includes:
        a low-speed gear shift stage with a largest gear ratio among the plurality of forward gear shift stages; and
        a predetermined gear shift stage with a gear ratio closest to a gear ratio of the reverse gear shift stage among the plurality of forward gear shift stages;
    the transmission includes:
        a predetermined gear shifting lever controlled by the operator to shift gear shift stages in the transmission;
        a lever arm to rock in a front-rear direction of the work vehicle by an operation of the predetermined gear shifting lever; and
        a lever protector assembly extending upward from the step and being between the lever arm and the step;
    the lever protector assembly is operable to stop the lever arm from rocking forward beyond a predetermined position by contact with the lever arm;
    the lever arm includes a first lever arm and a second lever arm outside the first lever arm in a width direction of the work vehicle;
    the lever protector assembly includes:
        a first lever protector to stop the first lever arm from rocking forward beyond the predetermined position by contact with the first lever arm; and
        a second lever protector to stop the second lever arm from rocking forward beyond the predetermined position by contact with the second lever arm, the second lever protector being spaced apart from the first lever protector in the width direction;
    the first lever protector is a rod-shaped first member that extends upward from the step; and
    the second lever protector is a rod-shaped second member that extends upward from the step and is different from the first member.

2. The work vehicle according to claim 1, further comprising another transmission including a plurality of gear shift stages with different gear ratios.

3. The work vehicle according to claim 1, wherein the gear ratio of the predetermined gear shift stage to the gear ratio of the reverse gear shift stage is at a ratio that is at least about 0.8:1 but no more than about 1.2:1.

4. The work vehicle according to claim 1, wherein
    the plurality of forward gear shift stages include:
        the low-speed gear shift stage;
        the predetermined gear shift stage; and
        a high-speed gear shift stage with a smallest gear ratio among the plurality of forward gear shift stages.

5. The work vehicle according to claim 1, wherein
    an operation position of the predetermined gear shifting lever includes:
        a reverse operation position at which the gear shift stage is shifted into the reverse gear shift stage; and
        a predetermined operation position at which the gear shift stage is shifted into the predetermined gear shift stage; and
    the predetermined gear shifting lever is movable linearly from the reverse operation position to the predetermined operation position.

6. The work vehicle according to claim 1, wherein
    the first lever protector includes an upper end portion that is to contact the first lever arm and that is chamfered; and
    the second lever protector includes an upper end portion that is to contact the second lever arm and that is chamfered.

* * * * *